US012754782B2

(12) United States Patent
Jang et al.

(10) Patent No.: US 12,754,782 B2
(45) Date of Patent: Oct. 6, 2026

(54) GATEWAY APPARATUS AND METHOD FOR DYNAMICALLY APPLYING API SETTINGS

(71) Applicant: Webare Soft Inc., Seongnam-si (KR)

(72) Inventors: Young Hwi Jang, Seoul (KR); Yeon Ju Lee, Seongnam-si (KR); Yong Hyuk Kim, Seongnam-si (KR)

(73) Assignee: WEBARE SOFT INC. (KR)

( * ) Notice: Subject to any disclaimer, the term of this patent is extended or adjusted under 35 U.S.C. 154(b) by 442 days.

(21) Appl. No.: 18/494,767

(22) Filed: Oct. 25, 2023

(65) Prior Publication Data

US 2024/0202049 A1 Jun. 20, 2024

(30) Foreign Application Priority Data

Dec. 20, 2022 (KR) ........................ 10-2022-0179929

(51) Int. Cl.
*G06F 9/54* (2006.01)

(52) U.S. Cl.
CPC .................................... *G06F 9/541* (2013.01)

(58) Field of Classification Search
None
See application file for complete search history.

(56) References Cited

U.S. PATENT DOCUMENTS 11,563,636 B1 * 1/2023 Kairali .................. H04L 67/563
2005/0071501 A1 * 3/2005 Cao .................. G06F 16/90344 707/E17.012
2005/0111475 A1 * 5/2005 Borkowski ............. H04L 49/90 370/437
2023/0388226 A1 * 11/2023 Agarwal ............. G06F 9/44521
2024/0078140 A1 * 3/2024 Srivastava .............. G06F 9/541

FOREIGN PATENT DOCUMENTS

KR 101653685 B1 9/2016
KR 102256736 B1 5/2021
KR 102407334 B1 6/2022
KR 20220081542 A 6/2022
KR 102417742 B1 7/2022

* cited by examiner

*Primary Examiner* — Mustafa A Amin

(74) *Attorney, Agent, or Firm* — Renaissance IP Law Group LLP

(57) ABSTRACT

A gateway apparatus and a method for dynamically applying API settings are disclosed. The gateway apparatus includes a sub-processing unit processing an API (application programming interface) request of a client terminal based on API settings through a plurality of sub-threads, a setting unit comprising a first rule table and a second rule table to store a set value for processing the API request, and a reference flag, and a main processing unit updating new API settings in a rule table other than the rule table corresponding to a reference value of the reference flag through a main thread when receiving the new API settings, and setting the reference value of the reference flag to a reference value corresponding to the updated rule table when the update is completed.

18 Claims, 5 Drawing Sheets

GATEWAY APPARATUS AND METHOD FOR DYNAMICALLY APPLYING API SETTINGS

CROSS-REFERENCE TO RELATED APPLICATION

This application claims priority to and the benefit of Korean Patent Application No. 10-2022-0179929 filed in the Korean Intellectual Property Office on Dec. 20, 2022, the entire contents of which are incorporated herein by reference.

TECHNICAL FIELD

The present disclosure relates to a gateway apparatus and, more particularly, to a gateway apparatus and method for dynamically applying API settings, which dynamically manage the API settings by minimizing a lock in a multi thread environment.

BACKGROUND

Generally, in a gateway apparatus with a multi thread configuration, each thread processes a client's API request based on API (application programming interface) settings that a user (manager) desires to dynamically apply. Here, the gateway apparatus periodically receives all settings including changes from an API manager device.

At this time, a specific thread should change the settings and another thread should read the settings and perform task work, so a race condition for the settings occurs, resulting in a situation where a lock should be used. In other words, the thread should write after obtaining the lock, and read after obtaining the lock.

However, such a lock causes the degradation of performance when it is necessary to process the client's API request as quickly as possible.

SUMMARY

In view of the above, the present disclosure provides a gateway apparatus and method for dynamically applying API settings, which dynamically manage the API settings by minimizing a lock in a multi thread environment operating based on the same API settings between threads.

According to embodiments of the present disclosure, a gateway apparatus includes a sub-processing unit processing an API (application programming interface) request of a client terminal based on API settings through a plurality of sub-threads, a setting unit comprising a first rule table and a second rule table to store a set value for processing the API request, and a reference flag, and a main processing unit updating new API settings in a rule table other than the rule table corresponding to a reference value of the reference flag through a main thread when receiving the new API settings, and setting the reference value of the reference flag to a reference value corresponding to the updated rule table when the update is completed. The setting unit includes the first rule table storing the API settings for processing the API request, the second rule table storing API settings different from those of the first rule table, and the reference flag setting a reference value indicating the rule table in which the API settings to be referenced by the plurality of sub-threads so as to process the API request at a current time are stored, among the first rule table and the second rule table.

The sub-processing unit checks the reference value of the reference flag prior to processing the API request, and processes the API request based on the API settings stored in the rule table indicated by the reference value.

The first rule table and the second rule table give a read function to the plurality of sub-threads, and give read and write functions to the main thread.

Each of the first rule table and the second rule table is created as a global data structure.

The main processing unit initializes the rule table where update is performed, and then performs the update by storing the new API settings.

The main processing unit determines whether there are any changes by comparing the new API settings with the current API settings, and performs the update if there are changes.

According to embodiments of the present disclosure, an API setting method of a gateway apparatus, including a first rule table and a second rule table each storing API settings for processing the API request, and a reference flag setting a reference value indicating the rule table in which the API settings are stored to process the API request at a current time, among the first rule table and the second rule table, includes receiving, by a main processing unit of the gateway apparatus, new API settings from an API manager device, updating, by the main processing unit, the new API settings in a rule table other than the rule table corresponding to the reference value of the reference flag, setting, by the main processing unit, the reference value of the reference flag to a reference value corresponding to the updated rule table, and processing, by a sub-processing unit of the gateway apparatus, the API request based on API settings of the rule table corresponding to the reference value of the reference flag.

The updating the new API settings initializes the rule table where update is performed, and then performs the update by storing the new API settings.

The updating the new API settings determines whether there are any changes by comparing the new API settings with the current API settings, and performs the update if there are changes.

The processing the API request checks the reference value of the reference flag prior to processing the API request, and processes the API request based on the API settings stored in the rule table indicated by the reference value.

The first rule table and the second rule table give a read function to the plurality of sub-threads, and give read and write functions to the main thread.

Each of the first rule table and the second rule table is created as a global data structure.

According to embodiments of the present disclosure, an API setting system includes at least one gateway apparatus mediating a communication linkage between a plurality of client terminals and a plurality of target servers, and managing API settings for processing an API request, and an API manager device providing the API settings to the gateway apparatus at a preset period. The gateway apparatus includes a sub-processing unit processing an API request of a client terminal based on API settings through a plurality of sub-threads, a setting unit comprising a first rule table and a second rule table to store a set value for processing the API request, and a reference flag, and a main processing unit updating new API settings in a rule table other than the rule table corresponding to a reference value of the reference flag through a main thread when receiving the new API settings, and setting the reference value of the reference flag to a reference value corresponding to the updated rule table when the update is completed. The setting unit includes the first rule table storing the API settings for processing the API request, the second rule table storing API settings different from those of the first rule table, and the reference flag setting a reference value indicating the rule table in which the API settings to be referenced by the plurality of sub-threads so as to process the API request at a current time are stored, among the first rule table and the second rule table.

The sub-processing unit checks the reference value of the reference flag prior to processing the API request, and processes the API request based on the API settings stored in the rule table indicated by the reference value.

The first rule table and the second rule table give a read function to the plurality of sub-threads, and give read and write functions to the main thread.

Each of the first rule table and the second rule table is created as a global data structure.

The main processing unit initializes the rule table where update is performed, and then performs the update by storing the new API settings.

The main processing unit determines whether there are any changes by comparing the new API settings with the current API settings, and performs the update if there are changes.

According to an embodiment of the present disclosure, it is possible to prevent the performance of a system from being degraded by using two rule tables in a multi thread environment to access the latest API settings without a lock.

DETAILED DESCRIPTION

Figure 1:
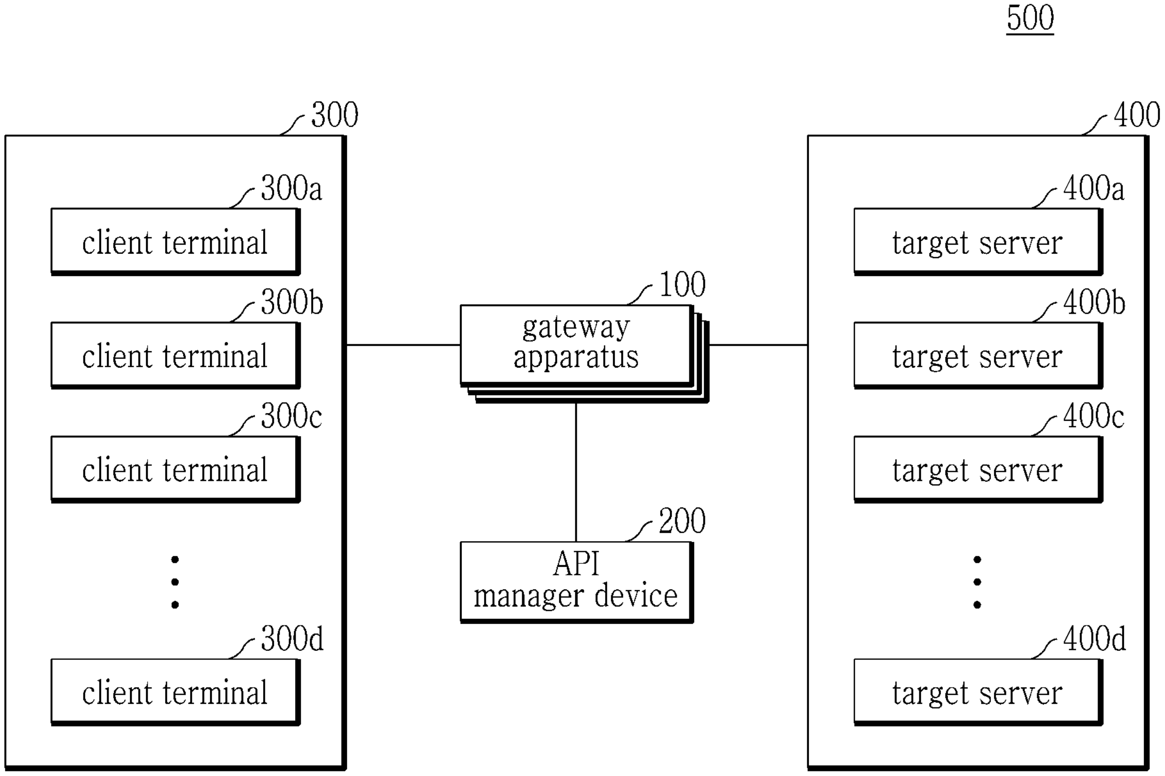
FIG. 1 is a configuration diagram illustrating an API setting system according to an embodiment of the present disclosure.

Hereinafter, an embodiment of the present disclosure will be described in detail with reference to the accompanying drawings such that those skilled in the art can easily implement the present disclosure. However, the present disclosure will be implemented in many different forms without being limited to the embodiments described herein. In order to clearly explain the present disclosure, parts that are not related to the description are omitted in the drawings. Like reference numerals refer to like parts throughout various figures and embodiments of the present disclosure.

In this specification and drawings (hereinafter referred to as "this specification"), duplicate descriptions of the same components are omitted.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present.

The terminology used herein is for the purpose of describing particular embodiments only and is not intended to be limiting.

In this specification, the singular forms are intended to include the plural forms as well, unless the context clearly indicates otherwise.

It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

In this specification, the term "and/or" includes a combination of a plurality of listed items or any item among a plurality of listed items. In this specification, "A or B" may include "A", "B", or "both A and B".

In the following description, if it is decided that the detailed description of known technologies related to the present disclosure makes the subject matter of the embodiments described herein unclear, the detailed description will be omitted.

FIG. 1 is a configuration diagram illustrating an API setting system according to an embodiment of the present disclosure.

Referring to FIG. 1, the API setting system 500 dynamically manages API settings by minimizing a lock in a multi thread environment that operates based on the same API settings between threads. The API setting system 500 includes a gateway apparatus 100 and an API manager device 200, and may further include a client terminal 300 and a target server 400.

The gateway apparatus 100 mediates a communication linkage between a plurality of client terminals 200 and a plurality of target servers 300. The gateway apparatus 100 may include at least one apparatus, and may be configured based on a multi thread.

The gateway apparatus 100 receives the API settings from the API manager device 200 at a preset period. At this time, the gateway apparatus 100 may actively read the API settings rather than passively receiving the API settings. The gateway apparatus 100 includes two rule tables in the multi thread environment and a reference flag indicating a rule table storing the API settings that are required to process an API request at a current time among the two rule tables. Thereby, the gateway apparatus 100 helps each thread check a reference value of the reference flag and access API settings appropriate for the current time without the lock.

The API manager device 200 communicates with at least one gateway apparatus 100. The API manager device 200 manages the API settings including the rule for processing the API request. The API manager device 200 may provide the managed API settings to the gateway apparatus 100 at a preset period. Here, the preset period may range from 5 to 20 seconds, but is not limited thereto.

The client terminal 300 is a terminal used by a client, and may include a plurality of terminals 300*a*, 300*b*, 300*c*, and 300*d*. Each client terminal 300 makes an API request for a task, and receives and outputs a response to the API request. At this time, the client terminal 300 may communicate with the target server 400 through the gateway apparatus 100. Preferably, the client terminal 300 may be a computing system including a smartphone, a desktop, a laptop, a tablet PC, a handheld PC, etc.

The target server 400 is a server that provides various contents, and may include a plurality of servers 400*a*, 400*b*, 400*c*, and 400*d*. At this time, the target server 400 may be a server that decentralizes data on one site, but is not limited thereto. Each target server 400 has a unique IP (internet protocol) address, so a TCP connection is possible through the IP address. When the target server 400 establishes the TCP connection and receives the API request related to the task, it provides response information about the API request. The target server 400 may transmit the response information to the gateway apparatus 100. Preferably, the target server 400 may be a computing system including a server computer, a cluster computer, etc.

Figure 2:
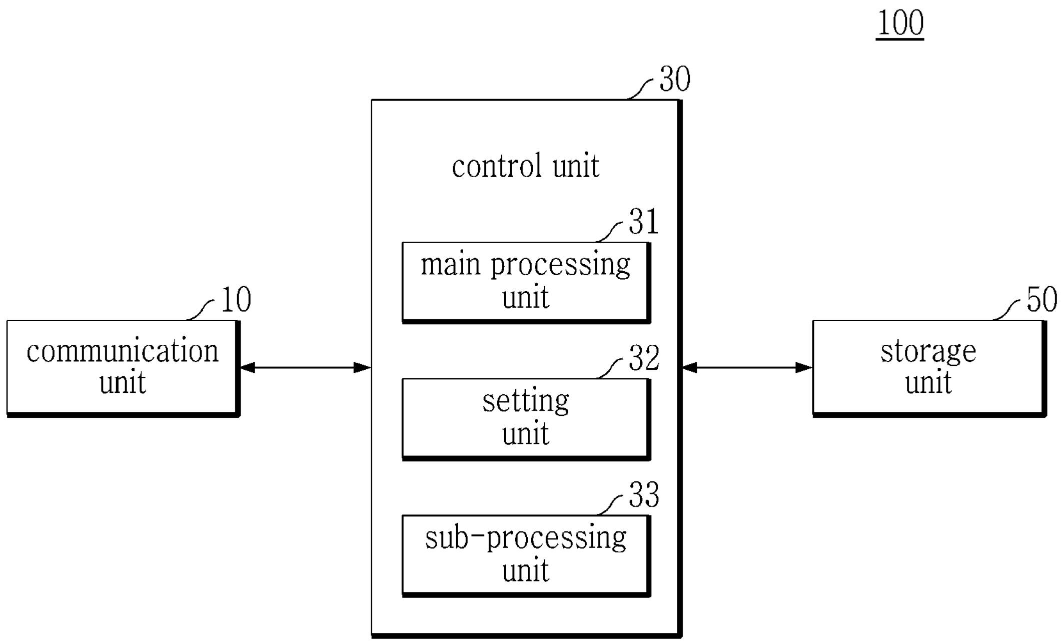
FIG. 2 is a block diagram illustrating a gateway apparatus according to an embodiment of the present disclosure.
Figure 3:
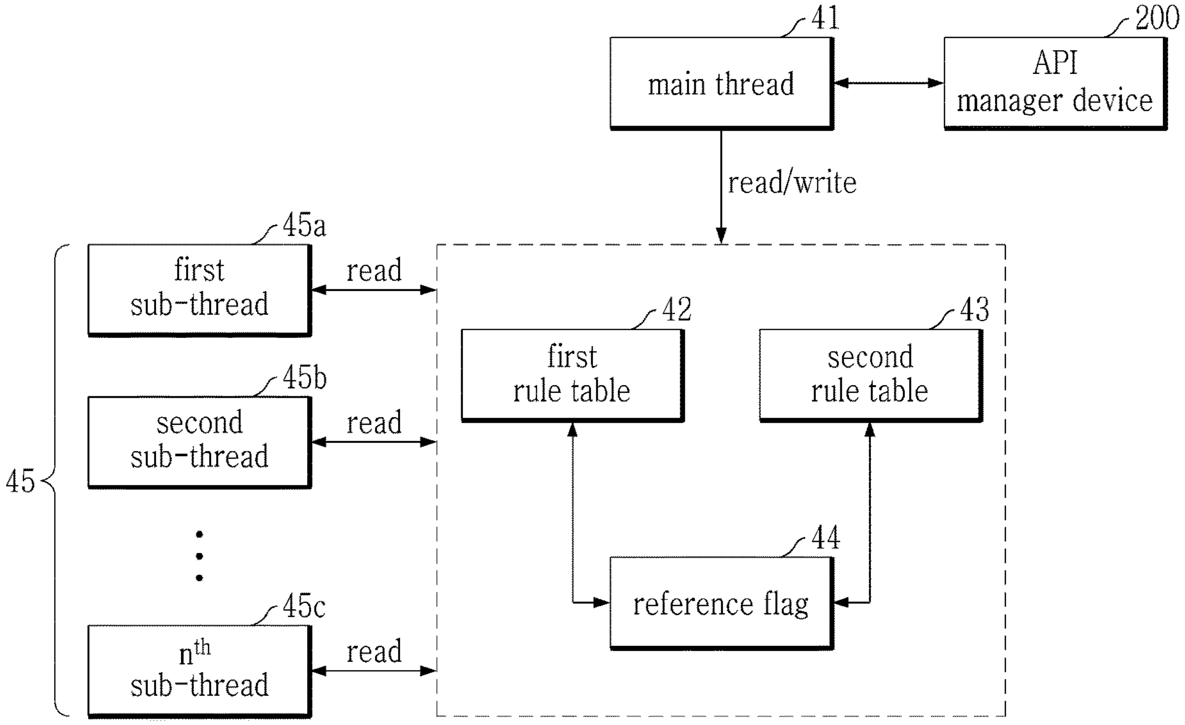
FIG. 3 is a diagram illustrating an API setting process according to an embodiment of the present disclosure.

FIG. 2 is a block diagram illustrating the gateway apparatus according to an embodiment of the present disclosure, and FIG. 3 is a diagram illustrating an API setting process according to an embodiment of the present disclosure.

Referring to FIGS. 1 to 3, the gateway apparatus 100 includes a communication unit 10, a control unit 30, and a storage unit 50.

The communication unit 10 communicates with the API manager device 200, the client terminal 300, and the target server 400. The communication unit 10 may transmit a request message requesting the API settings to the API manager device 200, and receive new API settings from the API manager device 200. The communication unit 10 receives the API request related to a task from the client terminal 300 and transmits the response information corresponding to the API request to the client terminal 300. The communication unit 10 transmits the API request related to the task to the target server 400, and receives the response information corresponding to the API request from the target server 400.

The control unit 30 performs an overall control over the gateway apparatus 100. The control unit 30 includes a plurality of threads, two rule tables, and a reference flag, and controls the API settings through the threads, the two rule tables, and the reference flag. The control unit 30 includes a main processing unit 31, a setting unit 32, and a sub-processing unit 33. Here, the setting unit 32 includes a first rule table 42, a second rule table 43, and a reference flag 44.

The main processing unit 31 manages the API settings through a main thread 41. To this end, the main processing unit 31 does not perform processing related to the API request, but performs communication with the API manager device 200 and management of the rule tables 42 and 43/reference flag 44.

In detail, when the main processing unit 31 receives new API settings from the API manager device 200, the main processing unit updates the new API settings in a rule table other than the rule table corresponding to the reference value of the reference flag 44. At this time, the main processing unit 31 initializes the rule table where update is performed, and then performs the update by storing the new API settings. When the update is completed, the main processing unit 31 sets the reference value of the reference flag 44 to the reference value corresponding to the updated rule table. For instance, when the API settings for processing the API request at a current time are the API settings stored in the first rule table 42, and the reference flag 44 is set to zero, which is the reference value representing the first rule table 42, the main processing unit 31 initializes the second rule table 43 when new API settings are received, and updates the new API settings by storing them in the second rule table 43. When the update is completed, the main processing unit 31 sets the reference value of the reference flag 44 to one, which is the reference value representing the second rule table 43. In this way, the main processing unit 31 may alternately update the API settings stored in the first rule table 42 and the second rule table 43 through the main thread 41.

Here, the main processing unit 31 initializes the rule table before updating the rule table, so it processes the API request based on the existing API settings until the update of the rule table is completed. When the update is completed, it is possible to prevent an error due to the API settings, which may occur while the API request is processed and updated based on the new API settings.

Further, the main processing unit 31 determines whether there are any changes by comparing the new API settings with the current API settings, that is, the API settings stored in the first rule table 42. The main processing unit 31 may perform the update if there are changes, and may not perform the update if there are no changes.

The setting unit 32 stores a set value for processing the API request. The setting unit 32 includes the first rule table 42 and the second rule table 43 to store the API settings, and includes the reference flag 44 indicating the rule table in which the API settings to be referenced are stored.

In detail, the first rule table 42 is a table in which the API settings for processing the API request are stored. The first rule table 42 may be created as a global data structure. After the first rule table 42 is initialized, new API settings may be stored. The first rule table 42 gives a read function to a plurality of sub-threads 45, and gives read and write functions to the main thread 41.

The second rule table 43 is a table in which API settings different from those of the first rule table 42 are stored. The second rule table 43 may be created as a global data structure. After the second rule table 43 is initialized, new API settings may be stored. The second rule table 43 gives a read function to the plurality of sub-threads 45, and gives read and write functions to the main thread 41.

The reference flag 44 sets a reference value indicating the rule table in which the API settings to be referenced by the plurality of sub-threads 45 so as to process the API request at a current time are stored, among the first rule table 42 and the second rule table 43. For example, the reference flag 44 may be configured such that the reference value representing the first rule table 42 is set to zero and the reference value representing the second rule table 43 is set to one. Here, the reference flag 44 changes the reference value set by the main thread 41.

The sub-processing unit 33 processes the API request of the client terminal 300 based on the API settings through the plurality of sub-threads 45. The plurality of sub-threads 45 may include a first sub-thread 45*a*, a second sub-thread 45*b* to an nth sub-thread 45*c*. The sub-processing unit 33 checks the reference value of the reference flag 44 prior to processing the API request. The sub-processing unit 33 may process the API request based on the API settings stored in the rule table indicated by the reference value. For example, when the reference value of the reference flag is set to one at the current time, the sub-processing unit 33 reads the API settings stored in the second rule table 43, and then performs the API request based on the read API settings.

Figure 4:
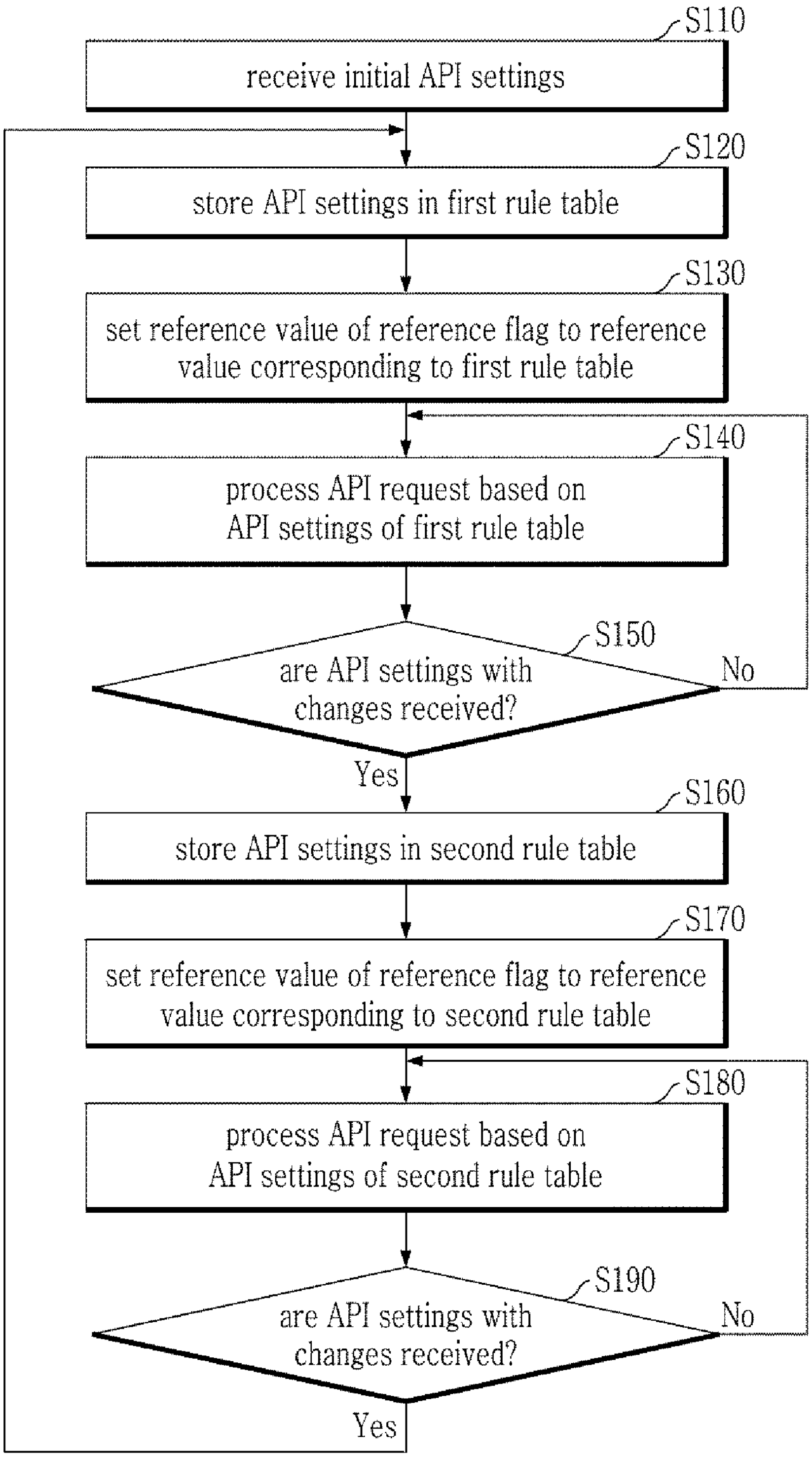
FIG. 4 is a flowchart illustrating an API setting method of a gateway apparatus according to an embodiment of the present disclosure.

FIG. 4 is a flowchart illustrating an API setting method of a gateway apparatus according to an embodiment of the present disclosure.

Referring to FIGS. 1, 3, and 4, the API setting method of the gateway apparatus 100 can prevent the performance of the system from being degraded by using two rule tables in a multi thread environment to access the latest API settings without a lock. Here, the gateway apparatus 100 includes a main processing unit 31 and a sub-processing unit 33.

At step S110, the main processing unit 31 receives initial API settings. The main processing unit 31 receives the API settings for initialization from the API manager device 200.

Here, the API settings refer to a set value (e.g. request a is delivered to b) for processing the API request by the sub-processing unit 33.

At step S120, the main processing unit 31 stores the API settings received through the main thread 41 in the first rule table 42. The main processing unit 31 initializes the first rule table using the write function, and then stores the API settings.

At step S130, the main processing unit 31 sets the reference value of the reference flag 44 through the main thread 41. The main processing unit 31 sets the reference value of the reference flag 44 to zero, which is the reference value corresponding to the first rule table 42.

At step S140, the sub-processing unit 33 processes the API request based on the API settings of the first rule table 42 through the plurality of sub-threads 45. The sub-processing unit 33 checks the reference value of the reference flag 44, which is 0, and then reads the API settings stored in the first rule table 42 and processes the API request based on the read API settings.

At step S150, the main processing unit 31 determines whether API settings with changes are received. When it is determined that the API settings with changes are received, the main processing unit 31 performs step S160. When it is determined that the API settings with changes are not received, the main processing unit performs step S140.

At step S160, the main processing unit 31 stores new API settings in the second rule table through the main thread 41. The main processing unit 31 initializes the second rule table using the write function, and then stores the API settings.

At step S170, the main processing unit 31 sets the reference value of the reference flag 44 through the main thread 41. The main thread 41 sets the reference value of the reference flag 44 to 1, which is the reference value corresponding to the second rule table 43.

At step S180, the sub-processing unit 33 processes the API request based on the API settings of the second rule table 43 through the plurality of sub-threads 45. The sub-processing unit 33 checks the reference value of the reference flag 44, which is 1, and then reads the API settings stored in the second rule table 43 and processes the API request based on the read API settings.

At step S190, the main processing unit 31 determines whether the API settings with changes are received. When it is determined that the API settings with changes are received, the main processing unit 31 performs step S120. When it is determined that the API settings with changes are not received, the main processing unit performs step S180.

Figure 5:
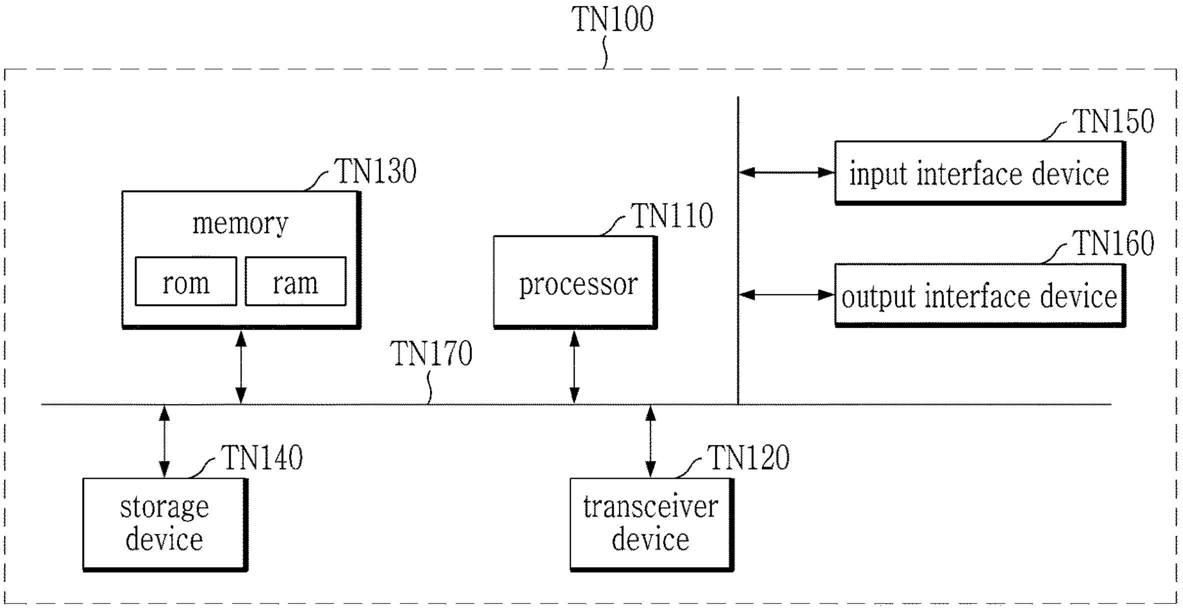
FIG. 5 is a block diagram illustrating a computing device according to an embodiment of the present disclosure.

FIG. 5 is a block diagram illustrating a computing device according to an embodiment of the present disclosure.

Referring to FIG. 5, the computing device TN100 may be a device described herein (e.g. a gateway device, an API manager device, a client terminal, a target server, etc.).

The computing device TN100 may include at least one processor TN110, a transceiver device TN120, and a memory TN130. The computing device TN100 may further include a storage device TN140, an input interface device TN150, and an output interface device TN160. Components included in the computing device TN100 may be connected by a bus TN170 to communicate with each other.

The processor TN110 may execute a program command stored in at least one of the memory TN130 and the storage device TN140. The processor TN110 may refer to a central processing unit (CPU), a graphics processing unit (GPU), or a dedicated processor on which methods according to embodiments of the present disclosure are performed. The processor TN110 may be configured to implement procedures, functions, and methods described in connection with embodiments of the present disclosure. The processor TN110 may control each component of the computing device TN100.

Each of the memory TN130 and the storage device TN140 may store various pieces of information related to the operation of the processor TN110. Each of the memory TN130 and the storage device TN140 may be comprised of at least one of a volatile storage medium and a non-volatile storage medium. For example, the memory TN130 may be comprised of at least one of read only memory (ROM) and random access memory (RAM).

The transceiver device TN120 may transmit or receive wired signals or wireless signals. The transceiver device TN120 may be connected to a network and perform communication.

Meanwhile, the embodiments of the present disclosure may be implemented through the above-described apparatus and/or method as well as through a program that realizes the function corresponding to the configuration of the embodiment of the present disclosure or a recording medium on which the program is recorded. This can be easily implemented by those skilled in the art from the description of the above-described embodiments.

Although the present disclosure was provided above in relation to specific embodiments shown in the drawings, it is apparent to those skilled in the art that the present disclosure may be changed and modified in various ways without departing from the scope of the present disclosure, which is described in the following claims.

DETAILED DESCRIPTION OF MAIN ELEMENTS

10: communication unit
30: control unit
31: main processing unit
32: setting unit
33: sub-processing unit
41: main thread
42: first rule table
43: second rule table
44: reference flag
45: sub-thread
50: storage unit
100: gateway apparatus
200: API manager device
300: client terminal
400: target server
500: API setting system

What is claimed is:

1. An API (application programming interface) setting method of a gateway apparatus comprising a first rule table and a second rule table each storing API settings for processing an API request, and a reference flag setting a reference value indicating which rule table, among the first rule table and the second rule table, in which the API settings are stored to process the API request at a current time, the method comprising:

- receiving, by a main processing unit of the gateway apparatus, new API settings from an API manager device;
- updating, by the main processing unit, the new API settings in a rule table other than a rule table corresponding to the reference value of the reference flag;

setting, by the main processing unit, the reference value of the reference flag to a reference value corresponding to the updated rule table; and processing, by a sub-processing unit of the gateway apparatus, the API request based on API settings of the rule table corresponding to the reference value of the reference flag.

2. The API setting method of claim 1, wherein the updating the new API settings initializes the rule table where update is performed, and then performs the update by storing the new API settings.

3. The API setting method of claim 1, wherein the updating the new API settings determines whether there are any changes by comparing a new API settings with the current API settings, and performs the update if there are changes.

4. The API setting method of claim 1, wherein the processing the API request checks the reference value of the reference flag prior to processing the API request, and processes the API request based on the API settings stored in the rule table indicated by the reference value.

5. The API setting method of claim 1, wherein the first rule table and the second rule table give a read function to the plurality of sub-threads, and give read and write functions to the main thread.

6. The API setting method of claim 1, wherein each of the first rule table and the second rule table is created as a global data structure.

7. A gateway apparatus comprising:

at least one processor;

a memory coupled to the at least one processor; and a setting unit implemented in the memory, the setting unit comprising a first rule table and a second rule table to store a set value for processing an API (application programming interface) request, and a reference flag, wherein the memory stores program commands that, when executed by the at least one processor, cause the gateway apparatus to implement:

a sub-processing unit that processes the API request of a client terminal based on API settings through a plurality of sub-threads; and a main processing unit that updates new API settings in a rule table other than a rule table corresponding to a reference value of the reference flag through a main thread when receiving the new API settings, and sets the reference value of the reference flag to a reference value corresponding to the updated rule table when the update is completed, wherein the first rule table stores the API settings for processing the API request, wherein the second rule table stores API settings different from those of the first rule table, and wherein the reference flag sets a reference value indicating which rule table, among the first rule table and the second rule table, in which the API settings to be referenced by the plurality of sub-threads so as to process the API request at a current time are stored.

8. The gateway apparatus of claim 7, wherein the sub-processing unit checks the reference value of the reference flag prior to processing the API request, and processes the API request based on the API settings stored in the rule table indicated by the reference value.

9. The gateway apparatus of claim 7, wherein the first rule table and the second rule table give a read function to the plurality of sub-threads, and give read and write functions to the main thread.

10. The gateway apparatus of claim 7, wherein each of the first rule table and the second rule table is created as a global data structure.

11. The gateway apparatus of claim 7, wherein the main processing unit initializes the rule table where update is performed, and then performs the update by storing the new API settings.

12. The gateway apparatus of claim 7, wherein the main processing unit determines whether there are any changes by comparing the new API settings with a current API settings, and performs the update if there are changes.

13. An API (application programming interface) setting system comprising:

at least one gateway apparatus mediating a communication linkage between a plurality of client terminals and a plurality of target servers, and managing API settings for processing an API request; and an API manager device providing the API settings to the gateway apparatus at a preset period, wherein the gateway apparatus comprises:

at least one processor;

a memory coupled to the at least one processor; and a setting unit implemented in the memory, the setting unit comprising a first rule table and a second rule table to store a set value for processing the API request, and a reference flag, wherein the memory stores program commands that, when executed by the at least one processor, cause the gateway apparatus to implement:

a sub-processing unit that processes the API request of a client terminal based on API settings through a plurality of sub-threads;

a main processing unit that updates new API settings in a rule table other than a rule table corresponding to a reference value of the reference flag through a main thread when receiving the new API settings, and sets the reference value of the reference flag to a reference value corresponding to the updated rule table when the update is completed, wherein the first rule table stores the API settings for processing the API request, wherein the second rule table stores API settings different from those of the first rule table, and wherein the reference flag sets a reference value indicating which rule table, among the first rule table and the second rule table, in which the API settings to be referenced by the plurality of sub-threads so as to process the API request at a current time are stored.

14. The API setting system of claim 13, wherein the sub-processing unit checks the reference value of the reference flag prior to processing the API request, and processes the API request based on the API settings stored in the rule table indicated by the reference value.

15. The API setting system of claim 13, wherein the first rule table and the second rule table give a read function to the plurality of sub-threads, and give read and write functions to the main thread.

16. The API setting system of claim 13, wherein each of the first rule table and the second rule table is created as a global data structure.

17. The API setting system of claim 13, wherein the main processing unit initializes the rule table where update is performed, and then performs the update by storing the new API settings.

18. The API setting system of claim 13, wherein the main processing unit determines whether there are any changes by comparing the new API settings with the current API settings, and performs the update if there are changes.

* * * * *